(12) United States Patent
Kang et al.

(10) Patent No.: US 10,075,978 B2
(45) Date of Patent: Sep. 11, 2018

(54) TRANSMITTING NODE AND METHOD THEREIN FOR PERFORMING DATA TRANSMISSIONS TO AT LEAST ONE RECEIVING NODE ON A RADIO CHANNEL IN A WIRELESS COMMUNICATIONS NETWORK

(71) Applicant: Telefonaktiebolaget LM Ericsson (Publ), Stockholm (SE)

(72) Inventors: Du Ho Kang, Sollentuna (SE); Jung-Fu Cheng, Fremont, CA (US); Sorour Falahati, Stockholm (SE); Laetitia Falconetti, Solna (SE); Anders Furuskär, Stockholm (SE); Guido Roland Hiertz, Aachen (DE); Havish Koorapaty, Saratoga, CA (US); Daniel Larsson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 59 days.

(21) Appl. No.: 15/119,638

(22) PCT Filed: May 10, 2016

(86) PCT No.: PCT/SE2016/050416
§ 371 (c)(1),
(2) Date: Aug. 17, 2016

(87) PCT Pub. No.: WO2017/007391
PCT Pub. Date: Jan. 12, 2017

(65) Prior Publication Data
US 2017/0156161 A1    Jun. 1, 2017

Related U.S. Application Data

(60) Provisional application No. 62/188,883, filed on Jul. 6, 2015.

(51) Int. Cl.
*H04W 74/08* (2009.01)
*H04W 74/00* (2009.01)

(52) U.S. Cl.
CPC ..... *H04W 74/0816* (2013.01); *H04W 74/085* (2013.01); *H04W 74/0808* (2013.01)

(58) Field of Classification Search
CPC ............ H04W 74/08; H04W 74/0816; H04W 74/085; H04W 74/00; H04W 74/0808
See application file for complete search history.

(56) References Cited

U.S. PATENT DOCUMENTS

| | | | |
|---|---|---|---|
| 7,894,467 B2 * | 2/2011 | Hunzinger | H04L 47/10 370/350 |
| 8,155,102 B1 | 4/2012 | Hakola et al. | |

(Continued)

OTHER PUBLICATIONS

International Search Report and Written Opinion dated Aug. 19, 2016 for International Application Serial No. PCT/SE2016/050416, International Filing Date: May 10, 2016 consisting of 11-pages.

*Primary Examiner* — Tri H Phan
(74) *Attorney, Agent, or Firm* — Christopher & Weisberg, P.A.

(57) ABSTRACT

A transmitting node and a method performed by a transmitting node for performing data transmissions to at least one receiving node on a radio channel in a wireless communications network. First, the transmitting node sets at least two contention window sizes. The at least two contention window sizes are separately determined based on information associated with the least one receiving node. Then, the transmitting node defers a first transmission of data to the at least one receiving node for a first period and also defers at least one second transmission of data to the at least one receiving node. Further, the transmitting node performs a first or at least one second transmission of data to the at least one receiving node when an outcome of a corresponding (Continued)

first and at least second periods of observation of the radio channel, respectively, is that the radio channel is idle.

24 Claims, 11 Drawing Sheets

(56) References Cited

U.S. PATENT DOCUMENTS

| | | | | |
|---|---|---|---|---|
| 9,693,369 | B2* | 6/2017 | Nilsson | H04W 72/1215 |
| 2004/0264423 | A1* | 12/2004 | Ginzburg | H04W 74/0816 |
| | | | | 370/338 |
| 2005/0122902 | A1 | 6/2005 | Guo et al. | |
| 2006/0215686 | A1* | 9/2006 | Takeuchi | H04W 28/18 |
| | | | | 370/445 |
| 2009/0196306 | A1 | 8/2009 | King et al. | |
| 2013/0235721 | A1 | 9/2013 | Nguyen et al. | |
| 2016/0088513 | A1* | 3/2016 | Huang | H04W 74/0816 |
| | | | | 370/328 |
| 2016/0278078 | A1* | 9/2016 | Cheng | H04W 72/0446 |
| 2016/0278088 | A1* | 9/2016 | Cheng | H04L 47/27 |
| 2016/0309511 | A1* | 10/2016 | Li | H04W 74/0808 |
| 2016/0309512 | A1* | 10/2016 | Li | H04W 74/0816 |
| 2016/0338054 | A1* | 11/2016 | Oh | H04W 74/0841 |
| 2017/0005768 | A1* | 1/2017 | Yin | H04L 5/0055 |
| 2017/0055296 | A1* | 2/2017 | Cheng | H04W 74/0841 |
| 2017/0079010 | A1* | 3/2017 | Zhang | H04W 72/005 |
| 2017/0142017 | A1* | 5/2017 | Davis | H04L 47/24 |
| 2017/0142746 | A1* | 5/2017 | Koorapaty | H04W 72/1242 |

* cited by examiner

TRANSMITTING NODE AND METHOD THEREIN FOR PERFORMING DATA TRANSMISSIONS TO AT LEAST ONE RECEIVING NODE ON A RADIO CHANNEL IN A WIRELESS COMMUNICATIONS NETWORK

CROSS-REFERENCE TO RELATED APPLICATIONS

This Application is a Submission Under 35 U.S.C. § 371 for U.S. National Stage Patent Application of International Application No. PCT/SE2016/050416, filed May 10, 2016 entitled "TRANSMITTING NODE AND METHOD THEREIN FOR PERFORMING DATA TRANSMISSIONS TO AT LEAST ONE RECEIVING NODE ON A RADIO CHANNEL IN A WIRELESS COMMUNICATIONS NETWORK," which claims priority to U.S. Provisional Application No. 62/188,883, filed Jul. 6, 2015, entitled "TRANSMITTER AND METHOD THEREIN FOR PERFORMING DATA TRANSMISSIONS TO AT LEAST ONE RECEIVING NODE ON A RADIO CHANNEL IN A WIRELESS COMMUNICATIONS NETWORK," the entirety of both which are incorporated herein by reference

TECHNICAL FIELD

Embodiments herein relate to data transmissions in a wireless communications network. In particular, embodiments herein relate to a transmitting node and a method therein for performing data transmissions to at least one receiving node on radio channel in a wireless communications network.

BACKGROUND

Communication devices such as wireless devices are also known as, e.g., User Equipments (UE), mobile terminals, terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Wireless devices may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

The 3GPP initiative "Licensed Assisted Access" (LAA) intends to allow LTE equipment to also operate in the unlicensed 5 GHz radio spectrum. The unlicensed 5 GHz spectrum is used as a complement to the licensed spectrum. Accordingly, devices connect in the licensed spectrum (primary cell or PCell) and use carrier aggregation to benefit from additional transmission capacity in the unlicensed spectrum (secondary cell or SCell). To reduce the changes that may be required for aggregating licensed and unlicensed spectrum, the LTE frame timing in the primary cell is simultaneously used in the secondary cell.

Regulatory requirements, however, may not permit transmissions in the unlicensed spectrum without prior channel sensing. Since the unlicensed spectrum may be shared with other radios of similar or dissimilar wireless technologies, a so called listen-before-talk (LBT) method may need to be applied. Today, the unlicensed 5 GHz spectrum is mainly used by equipment implementing the IEEE 802.11 Wireless Local Area Network (WLAN) standard. This standard is known under its marketing brand "Wi-Fi."

In Europe, the LBT procedure is under the scope of EN 301.893 regulation. For LAA to operate in the 5 GHz spectrum the LAA LBT procedure may conform to requirements and minimum behaviors set forth in EN 301.893. However, additional system designs and steps may be needed to ensure coexistence of Wi-Fi and LAA with EN 301.893 LBT procedures.

In U.S. Pat. No. 8,774,209 B2, "Apparatus and method for spectrum sharing using listen-before-talk with quiet periods," LBT is adopted by frame-based OFDM systems to determine whether the channel is free prior to transmission. A maximum transmission duration timer is used to limit the duration of a transmission burst, and is followed by a quiet period.

Long Term Evolution (LTE)

LTE uses OFDM in the downlink and DFT-spread OFDM (also referred to as single-carrier FDMA) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

In the time domain, LTE downlink transmissions may be organized into radio frames of 10 ms, each radio frame consisting of ten equally-sized subframes of length Tsubframe=1 ms as shown in FIG. 1. For normal cyclic prefix, one subframe consists of 14 OFDM symbols. The duration of each symbol is approximately 71.4 μs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3.

From LTE Rel-11 onwards, above described resource assignments may also be scheduled on the enhanced Physical Downlink Control Channel (EPDCCH). For Rel-8 to Rel-10 only Physical Downlink Control Channel (PDCCH) is available.

The reference symbols shown in the above FIG. 3 are the cell specific reference symbols (CRS) and are used to support multiple functions including fine time and frequency synchronization and channel estimation for certain transmission modes.

Physical Downlink Control Channel (PDCCH) and Enhanced PDCCH (EPDCCH)

The PDCCH/EPDCCH is used to carry downlink control information (DCI) such as scheduling decisions and power-control commands. More specifically, the DCI includes:

Downlink scheduling assignments, including PDSCH resource indication, transport format, hybrid-ARQ information, and control information related to spatial multiplexing (if applicable).

A downlink scheduling assignment also includes a command for power control of the PUCCH used for transmission of hybrid-ARQ acknowledgements in response to downlink scheduling assignments. Uplink scheduling grants, including PUSCH resource indication, transport format, and hybrid-ARQ-related information. An uplink scheduling grant also includes a command for power control of the PUSCH.

Power-control commands for a set of terminals as a complement to the commands included in the scheduling assignments/grants.

One PDCCH/EPDCCH carries one DCI message containing one of the groups of information listed above. As multiple terminals can be scheduled simultaneously, and each terminal can be scheduled on both downlink and uplink simultaneously, there must be a possibility to transmit multiple scheduling messages within each subframe. Each scheduling message is transmitted on separate PDCCH/EPDCCH resources, and consequently there are typically multiple simultaneous PDCCH/EPDCCH transmissions within each subframe in each cell. Furthermore, to support different radio-channel conditions, link adaptation can be used, where the code rate of the PDCCH/EPDCCH is selected by adapting the resource usage for the PDCCH/EPDCCH, to match the radio-channel conditions.

Carrier Aggregation

The LTE Rel-10 standard supports bandwidths larger than 20 MHz. One feature on LTE Rel-10 may be to assure backward compatibility with LTE Rel-8. This may also include spectrum compatibility. That would imply that an LTE Rel-10 carrier, wider than 20 MHz, may appear as a number of LTE carriers to an LTE Rel-8 terminal. Each such carrier can be referred to as a Component Carrier (CC). In particular for early LTE Rel-10 deployments it may be expected that there may be a smaller number of LTE Rel-10-capable terminals compared to many LTE legacy terminals. Therefore, it may be necessary to assure an efficient use of a wide carrier also for legacy terminals, i.e. that it is possible to implement carriers where legacy terminals can be scheduled in all parts of the wideband LTE Rel-10 carrier. The straightforward way to obtain this may be by means of Carrier Aggregation (CA). CA implies that an LTE Rel-10 terminal may receive multiple CC, where the CC have, or at least the possibility to have, the same structure as a Rel-8 carrier. CA is illustrated in FIG. 4. A CA-capable UE is assigned a primary cell (PCell) which is always activated, and one or more secondary cells (SCells) which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. The number of CCs configured in a cell may be different from the number of CCs seen by a terminal: A terminal may for example support more downlink CCs than uplink CCs, even though the cell is configured with the same number of uplink and downlink CCs.

In addition, a key feature of carrier aggregation is the ability to perform cross-carrier scheduling. This mechanism allows a (E)PDCCH on one CC to schedule data transmissions on another CC by means of a 3-bit Carrier Indicator Field (CIF) inserted at the beginning of the (E)PDCCH messages. For data transmissions on a given CC, a UE expects to receive scheduling messages on the (E)PDCCH on just one CC—either the same CC, or a different CC via cross-carrier scheduling; this mapping from (E)PDCCH to PDSCH is also configured semi-statically.

Hybrid Automatic Request Retransmission (HARQ) Protocol

In the LTE system, a user equipment (UE) is notified by the network of downlink data transmission by the physical downlink control channel (PDCCH). Upon reception of a PDCCH in a particular subframe n, a UE is required to decode the corresponding physical downlink share channel (PDSCH) and to send ACK/NAK feedback in a subsequent subframe n+k. This is illustrated in FIG. 5. The ACK/NAK feedback informs the eNodeB whether the corresponding PDSCH was decoded correctly. When the eNodeB detects an ACK feedback, it can proceed to send new data blocks to the UE. When a NAK is detected by the eNodeB, coded bits corresponding to the original data block will be retransmitted. When the retransmission is based on repetition of previously sent coded bits, it is said to be operating in a Chase combining HARQ protocol. When the retransmission contains coded bits unused in previous transmission attempts, it is said to be operating in an incremental redundancy HARQ protocol.

In LTE, the ACK/NAK feedback is sent by the UE using one of the two possible approaches depending on whether the UE is simultaneously transmitting a physical uplink shared channel (PUSCH):

If the UE is not transmitting a PUSCH at the same time, the ACK/NAK feedback is sent via a physical uplink control channel (PUCCH).

If the UE is transmitting a PUSCH simultaneously, the ACK/NAK feedback is sent via the PUSCH.

Wireless Local Area Network

In typical deployments of WLAN, carrier sense multiple access with collision avoidance (CSMA/CA) may be used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle. When the range of several APs using the same frequency overlap, this means that all transmissions related to one AP might be deferred in case a transmission on the same frequency to or from another AP which is within range may be detected. Effectively, this means that if several APs are within range, they may have to share the channel in time, and the throughput for the individual APs may be severely degraded. A general illustration of the listen before talk (LBT) mechanism in Wi-Fi is shown in FIG. 6.

After a Wi-Fi station A transmits a data frame to a station B, station B may transmit the ACK frame back to station A with a delay of 16 μs. Such an ACK frame is transmitted by station B without performing an LBT operation. To prevent another station interfering with such an ACK frame transmission, a station may be defer for a duration of 34 μs (referred to as DIFS) after the channel is observed to be occupied before assessing again whether the channel is occupied.

Therefore, a station that wishes to transmit may first perform a CCA by sensing the medium for a fixed duration, DIFS. If the medium is idle then the station assumes that it may take ownership of the medium and begin a frame exchange sequence. If the medium is busy, the station may wait for the medium to go idle, defer for DIFS, and wait for a further random backoff period.

To further prevent a station from occupying the channel continuously and thereby prevent other stations from accessing the channel, it may be required for a station wishing to transmit again after a transmission is completed to perform a random backoff.

The PIFS may be used to gain priority access to the medium, and may be shorter than the DIFS duration. Among other cases, it may be used by STAs operating under PCF, to transmit Beacon Frames with priority. At the nominal beginning of each Contention-Free Period (CFP), the PC may sense the medium. When the medium is determined to be idle for one PIFS period (generally 25 μs), the PC may transmit a Beacon frame containing the CF Parameter Set element and a delivery traffic indication message element.

Load-Based Clear Channel Assessment in Europe Regulation EN 301.893

For a device not utilizing the Wi-Fi protocol, EN 301.893, v. 1.7.1 provides the following requirements and minimum behavior for the load-based clear channel assessment.

1) Before a transmission or a burst of transmissions on an Operating Channel, the equipment may perform a Clear Channel Assessment (CCA) check using "energy detect". The equipment may observe the Operating Channel(s) for the duration of the CCA observation time which may be not less than 20 μs. The CCA observation time used by the equipment may be declared by the manufacturer. The Operating Channel may be considered occupied if the energy level in the channel exceeds the threshold corresponding to the power level given in point 5 below. If the equipment finds the channel to be clear, it may transmit immediately (see point 3 below).

2) If the equipment finds an Operating Channel occupied, it may not transmit in that channel. The equipment may perform an Extended CCA check in which the Operating Channel is observed for the duration of a random factor N multiplied by the CCA observation time. N defines the number of clear idle slots resulting in a total Idle Period that may need to be observed before initiation of the transmission. The value of N may be randomly selected in the range 1 . . . q every time an Extended CCA is required and the value stored in a counter. The value of q is selected by the manufacturer in the range 4 . . . 32. This selected value may be declared by the manufacturer (see clause 5.3.1 q)). The counter may be decremented every time a CCA slot is considered to be "unoccupied". When the counter reaches zero, the equipment may transmit.

3) The equipment may be allowed to continue Short Control Signaling Transmissions on this channel providing it complies with the requirements in clause 4.9.2.3 in the Wi-Fi protocol, EN 301.893, v. 1.7.1. For equipment having simultaneous transmissions on multiple (adjacent or non-adjacent) operating channels, the equipment may be allowed to continue transmissions on other Operating Channels providing the CCA check did not detect any signals on those channels. The total time that an equipment makes use of an Operating Channel is the Maximum Channel Occupancy Time which may be less than $(13/32) \times q$ ms, with q as defined in point 2 above, after which the device may perform the Extended CCA described in point 2 above.

4) The equipment, upon correct reception of a packet which was intended for this equipment, may skip CCA and immediately (see note below) proceed with the transmission of management and control frames (e.g. ACK and Block ACK frames). A consecutive sequence of transmissions by the equipment, without it performing a new CCA, may not exceed the Maximum Channel Occupancy Time as defined in point 3 above. It should be noted that, for the purpose of multi-cast, the ACK transmissions (associated with the same data packet) of the individual devices are allowed to take place in a sequence.

5) The energy detection threshold for the CCA may be proportional to the maximum transmit power (PH) of the transmitter: for a 23 dBm e.i.r.p. transmitter the CCA threshold level (TL) may be equal or lower than −73 dBm/MHz at the input to the receiver (assuming a 0 dBi receive antenna). For other transmit power levels, the CCA threshold level TL may be calculated using the formula: TL=−73 dBm/MHz+23−PH (assuming a 0 dBi receive antenna and PH specified in dBm e.i.r.p.).

An example to illustrate the listen before talk (LBT) in EN 301.893 is provided in FIG. 7.

Truncated Exponential Backoff

In the above basic LBT protocol, when the medium becomes available, multiple Wi-Fi stations may be ready to transmit, which can result in collision. To reduce collisions, stations intending to transmit select a random backoff counter and defer for that number of slot channel idle times. The random backoff counter is selected as a random integer drawn from a uniform distribution over the interval of [0, CW−1]. Note that collisions can still happen even with this random backoff protocol when they are many stations contending for the channel access. Hence, to reduce continuous collisions, the contention window size can be varied.

For the IEEE specs, the default size of the random backoff contention window is set to CWmin. To reduce continuous collisions, the backoff contention window size CW is doubled whenever the station detects a collision of its transmission up to a limit, CWmax, set in the IEEE specs. When a station succeeds in a transmission without collision, it resets its random backoff contention window size back to the default value CWmin.

Licensed Assisted Access (LAA) to Unlicensed Spectrum Using LTE

Up to now, the spectrum used by LTE is dedicated to LTE. This has the advantage that an LTE system may not need to care about coexistence with other non-3GPP radio access technologies in the same spectrum and spectrum efficiency can be maximized. However, the spectrum allocated to LTE is limited which cannot meet the ever increasing demand for larger throughput from applications/services. Therefore, a new study item has been initiated in 3GPP on extending LTE to exploit unlicensed spectrum in addition to licensed spectrum.

With Licensed-Assisted Access to unlicensed spectrum as shown in FIG. 8, a UE is connected to a PCell in the licensed band and one or more SCells in the unlicensed band. In this application we may denote a secondary cell in unlicensed spectrum as LAA secondary cell (LAA SCell). The LAA SCell may operate in DL-only mode or operate with both UL and DL traffic. Furthermore, in future scenarios the LTE nodes may operate in standalone mode in license-exempt channels without assistance from a licensed cell. Unlicensed spectrum may, by definition, be simultaneously used by multiple different technologies. Therefore, LAA as described above may needs to consider coexistence with other systems such as IEEE 802.11 (Wi-Fi).

To coexist fairly with the Wi-Fi system, transmission on the SCell may conform to LBT protocols in order to avoid collisions and causing severe interference to on-going transmissions. This includes both performing LBT before commencing transmissions, and limiting the maximum duration of a single transmission burst. The maximum transmission burst duration is specified by country and region-specific regulations, for e.g., 4 ms in Japan and 13 ms in Europe according to EN 301.893. An example in the context of LAA is shown in FIG. 9 with different examples for the duration of a transmission burst on the LAA SCell constrained by a maximum allowed transmission duration of 4 ms.

Existing methods for LAA LTE to support LBT in unlicensed spectrum may comprise inappropriate delays of transmission that result in poor performance of a wireless communications network.

SUMMARY

It is an object of embodiments herein to improve the performance of a wireless communications network by providing improved methods of transmitting data in a wireless communications network.

According to a first aspect of embodiments herein, this object is achieved by providing a method performed by a transmitting node for performing data transmissions to at least one receiving node on a radio channel in a wireless communications network. The transmitting node sets at least two contention window sizes, wherein the at least two contention window sizes are separately determined based on information associated with the least one receiving node. Also, the transmitting node defers a first transmission of data to the at least one receiving node for a first period of observation of the radio channel determined by a first contention window size of the at least two contention window sizes. The transmitting node further defers at least one second transmission of data to the at least one receiving node for at least one second period of observation of the radio channel determined by at least a second contention window size of the at least two contention window sizes. Furthermore, the transmitting node performs the first or the at least one second transmission of data to the at least one receiving node when an outcome of the first or the at least second periods of observation of the radio channel, respectively, is that the radio channel is idle.

According to a second aspect of embodiments herein, this object is achieved by a transmitting node for performing data transmissions to at least one receiving node on a radio channel in a wireless communications network. The transmitting node is configured to set at least two contention window sizes, wherein the at least two contention window sizes are separately determined based on information associated with the least one receiving node. The transmitting node is also configured to defer a first transmission of data to the at least one receiving node for a first period of observation of the radio channel determined by a first contention window size of the at least two contention window sizes. Further, the transmitting node is configured to also defer at least one second transmission of data to the at least one receiving node for at least one second period of observation of the radio channel determined by at least a second contention window size of the at least two contention window sizes. The transmitting node is further configured to perform the first or the at least one second transmission of data to the at least one receiving node when an outcome of the first or the at least second periods of observation of the radio channel, respectively, is that the radio channel is idle.

According to a third aspect of embodiments herein, the object is achieved by a computer program, comprising instructions which, when executed on at least one processor, cause the at least one processor to carry out the method described above. According to a fourth aspect of embodiments herein, the object is achieved by a carrier containing the computer program described above, wherein the carrier is one of an electronic signal, optical signal, radio signal, or computer readable storage medium.

By separately determining and setting at least two contention window sizes based on information associated with the least one receiving node, e.g. maintaining multiple contention window sizes for multiple intended receivers, the transmission node is enabled to adapt its transmissions in view of different number of contending neighboring nodes, i.e. neighbors, in the vicinities of the intended receivers, i.e. at least one receiving node. In other words, the transmitting node is enabled to perform improved transmissions towards the intended receivers considering the intended receivers' channel conditions and interference situations. For example, when there is a large number of network nodes contending for channel access in the wireless communications network, this may ensure a fair coexistence between co-channel LAA and Wi-Fi and result in that unnecessarily long medium access delay may be avoided for the intended receivers that experience good SINR conditions, e.g. receivers being positioned close to the transmitting node.

Hence, the performance of the wireless communications network is improved.

BRIEF DESCRIPTION OF THE DRAWINGS

Examples of embodiments herein are described in more detail with reference to the accompanying drawings, in which.

DETAILED DESCRIPTION

Figure 1:
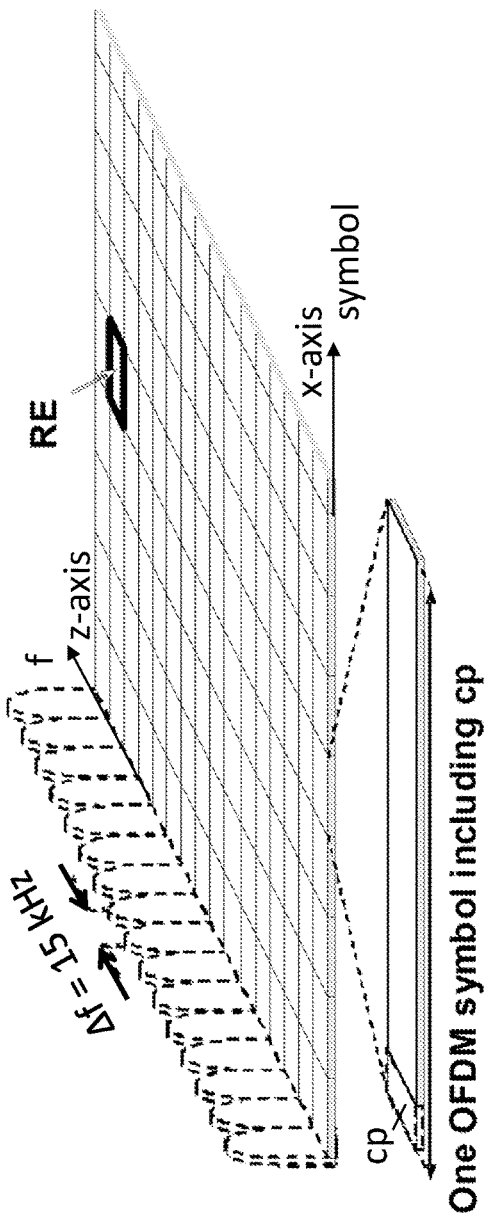
FIG. 1 is a schematic illustration of the LTE downlink physical resource.
Figure 2:
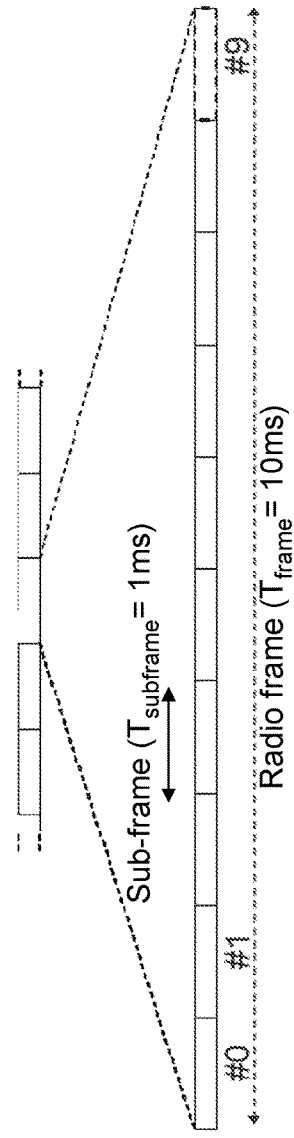
FIG. 2 is a schematic illustration of an LTE time-domain structure.
Figure 3:
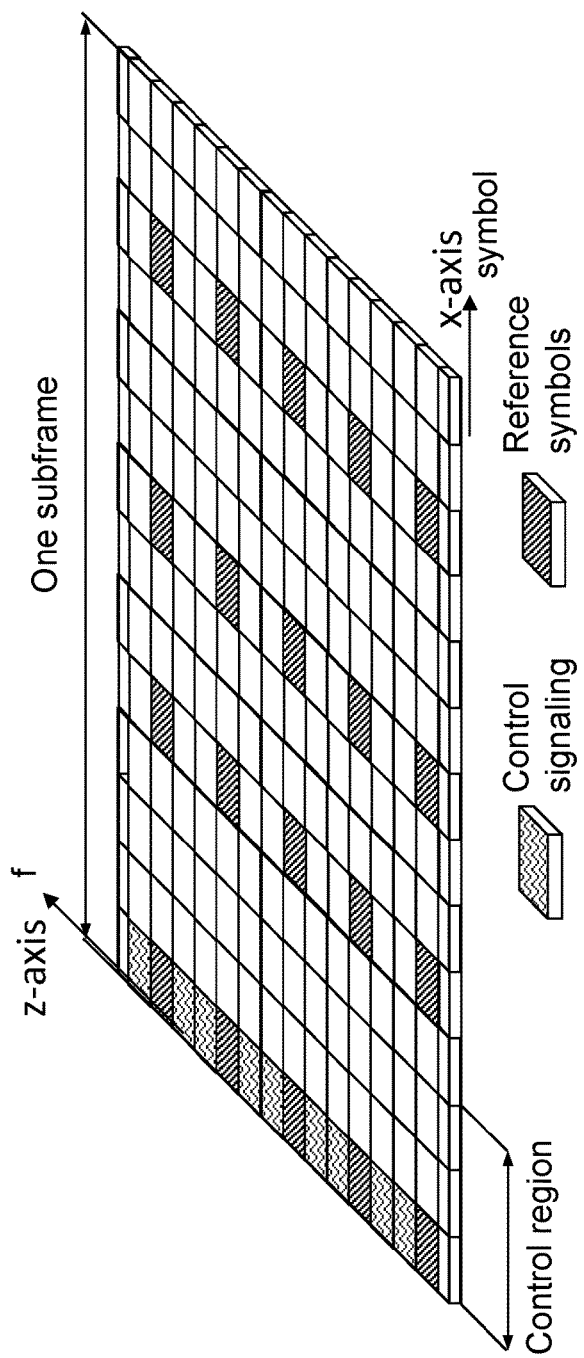
FIG. 3 is a schematic illustration of a normal downlink subframe.
Figure 4:
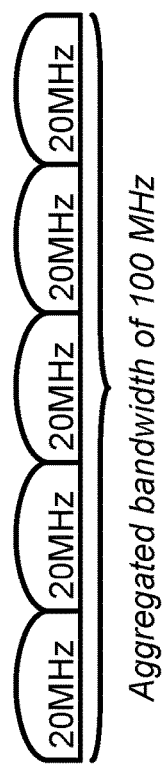
FIG. 4 is a schematic illustration of carrier aggregation.
Figure 5:
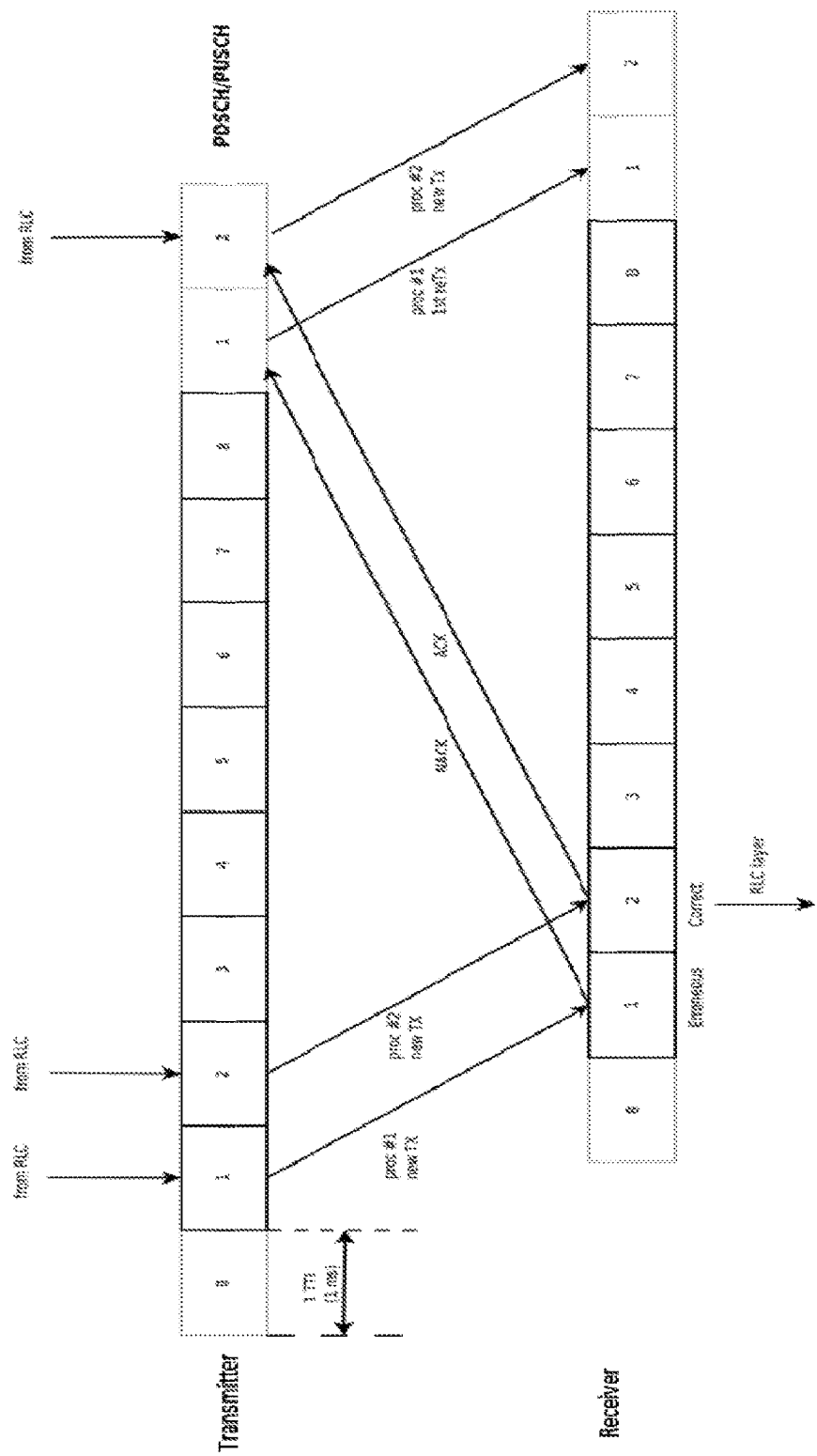
FIG. 5 is a schematic illustration of HARQ operations in LTE.
Figure 6:
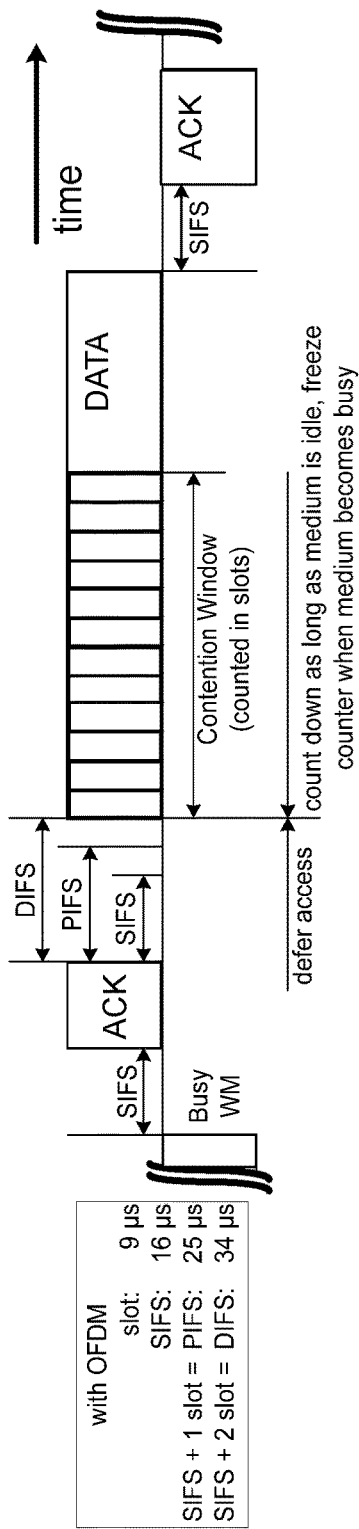
FIG. 6 is a schematic illustration of the LBT mechanism in Wi-Fi.
Figure 7:
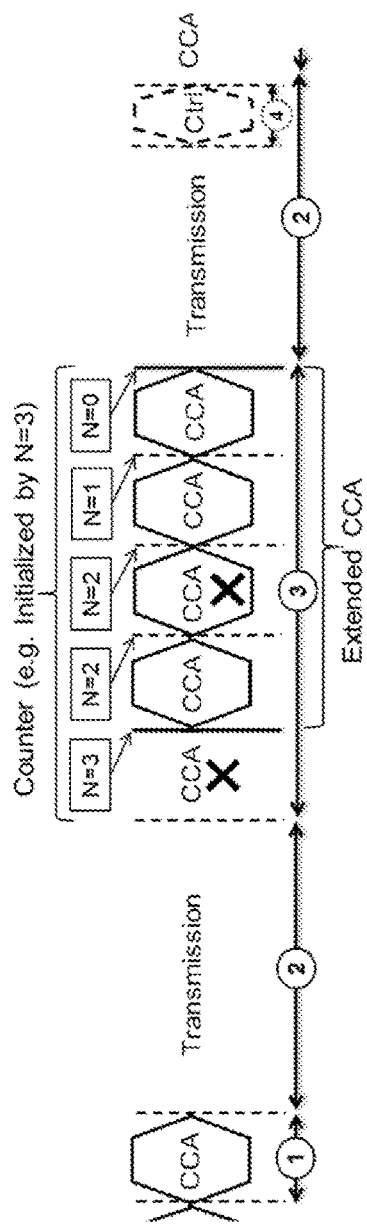
FIG. 7 is a schematic illustration of the LBT in EN 301.893.
Figure 8:
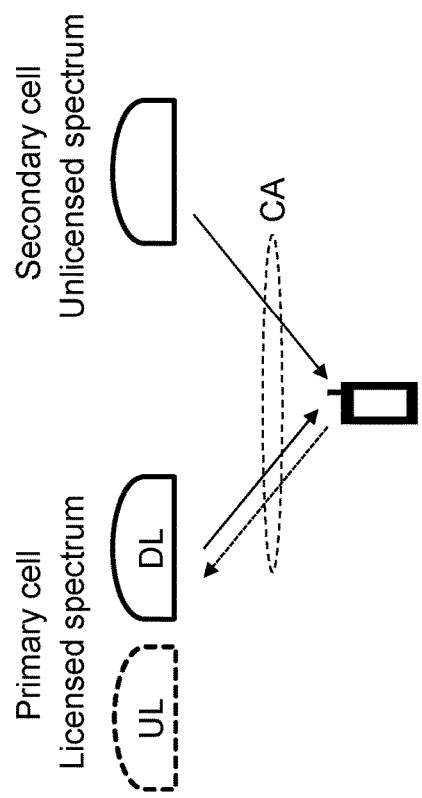
FIG. 8 illustrates a CA-capable UE configured with one LAA SCell.
Figure 9:
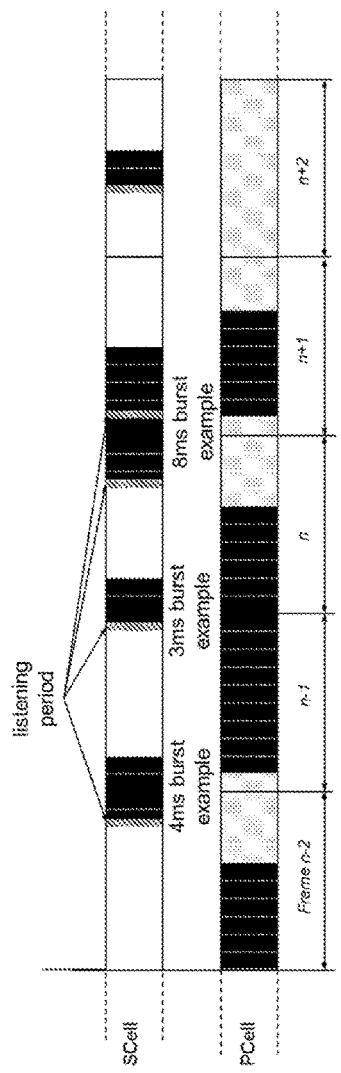
FIG. 9 is a schematic illustration of LAA to unlicensed spectrum using LTE carrier aggregation and LBT to ensure good coexistence with other unlicensed band technologies.

The following commonly terminologies are used in the embodiments and are elaborated below.

Radio network node: In some embodiments the non-limiting term radio network node is more commonly used and it refers to any type of network node serving UE and/or connected to other network node or network element or any radio node from where UE receives signal. Examples of radio network nodes are Node B, base station (BS), multi-standard radio (MSR) radio node such as MSR BS, eNode B, network controller, radio network controller (RNC), base station controller, relay, donor node controlling relay, base transceiver station (BTS), access point (AP), transmission points, transmission nodes, RRU, RRH, nodes in distributed antenna system (DAS) etc.

Network node: In some embodiments a more general term "network node" is used and it can correspond to any type of radio network node or any network node, which communicates with at least a radio network node. Examples of network node are any radio network node stated above, core network node (e.g. MSC, MME etc.), O&M, OSS, SON, positioning node (e.g. E-SMLC), MDT etc.

User equipment: In some embodiments the non-limiting term user equipment (UE) is used and it refers to any type of wireless device communicating with a radio network node in a cellular or mobile communication system. Examples of UE are target device, device to device UE, machine type UE or UE capable of machine to machine communication, PDA, iPAD, Tablet, mobile terminals, smart phone, laptop embedded equipped (LEE), laptop mounted equipment (LME), USB dongles, etc.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB and GSM, may also benefit from exploiting the ideas covered within this disclosure. Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel. Herein, we also focus on wireless transmissions in the downlink, but the embodiments herein are equally applicable in the uplink.

As part of the developing of the embodiments described herein, a problem will first be identified and discussed.

Conventionally, LBT systems adapt the contention window size for the transmitter. Such restriction is not optimal when a transmitter is able to transmit to several receivers at different distances and different number of neighbors. For instance, a WiFi transmitter doubles its contention window size if it does not receive the ACK at the expected time. The ACK however is related to the transmission to a given receiver. But the contention window size update is transmitter-specific and thus its increase due to a single receiver failing affects the performance of all possible receivers of the same transmitter.

Figure 10:
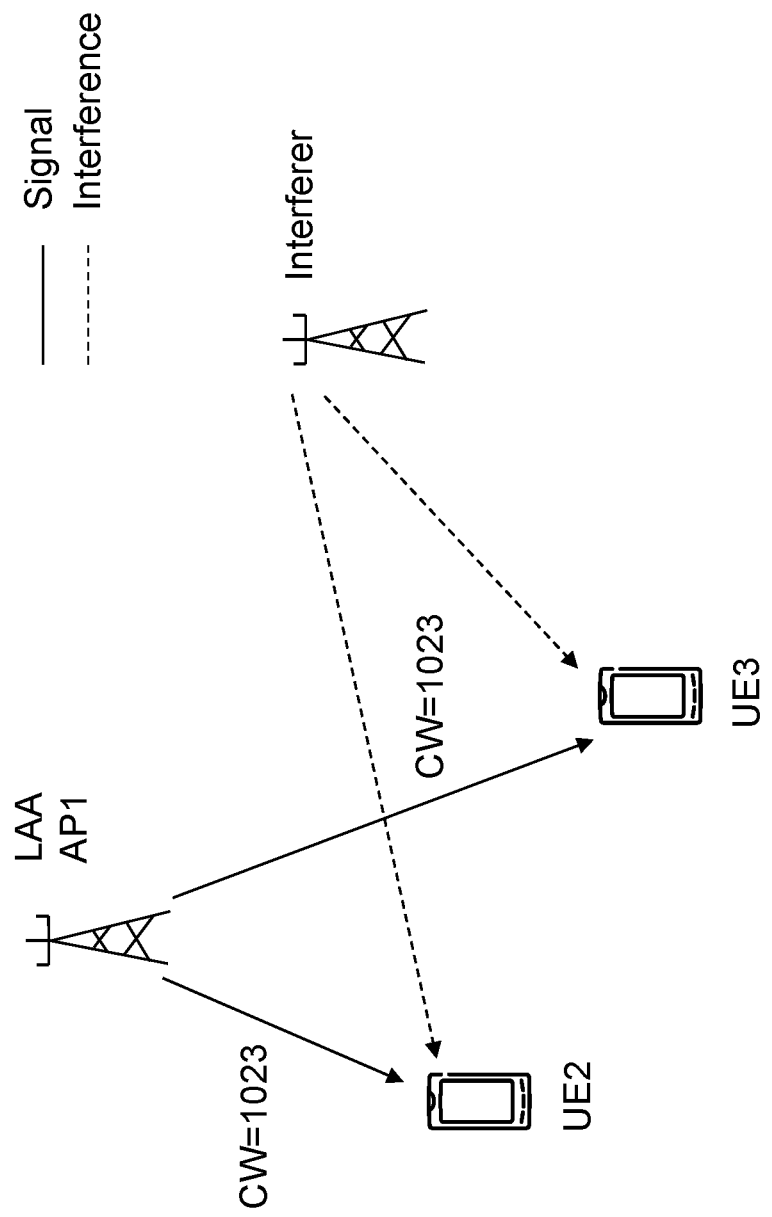
FIG. 10 illustrates transmitter dependent contention window adaptation.

An illustration of transmitter dependent contention window adaptation is given in FIG. 10. In this example, UE3 is far away from its serving LAA Access Point, AP1, and will experience severe interference from an interferer. As a result, LAA AP1 may increase its contention window size up to the maximum size because of continued frame errors. AP1 may wish to transmit to UE2 instead of continuing performing transmission to UE3 based on factors such latency, quality of services and contractual requirements. In the below example, UE2 is close to its serving AP1 and far away from an interfering node so that expected SINR can be high enough not to cause any frame error even without applying a large random backoff. However, traditional transmitter-dependent contention window adaptation schemes in typical LBT systems, e.g., IEEE 802.11 standard based WiFi, keeps the same contention window size for UE2 since CW is set to be specific to a transmitter, i.e. AP1 in this example. This makes unnecessarily long random backoff although intended receiver UE2 is very close to AP1 and expects very high SINR. This will delay to access the channel to eventually lower user data rates.

These issues are addressed by embodiments described herein, which are exemplified and explained in more detail below with reference to FIGS. 11-16. It should be noted that these embodiments are not mutually exclusive. Components from one embodiment may be tacitly assumed to be present in another embodiment and it will be obvious to a person skilled in the art how those components may be used in the other exemplary embodiments.

It should also be noted that in contrast to, for example, the apparatus and method described in U.S. Pat. No. 8,774,209 B2, embodiments herein focuses on the LBT phase of a load-based OFDM system, and are designed to ensure fairer coexistence with other radio access technologies such as Wi-Fi while also satisfying EN 301.893 regulations.

Figure 11:
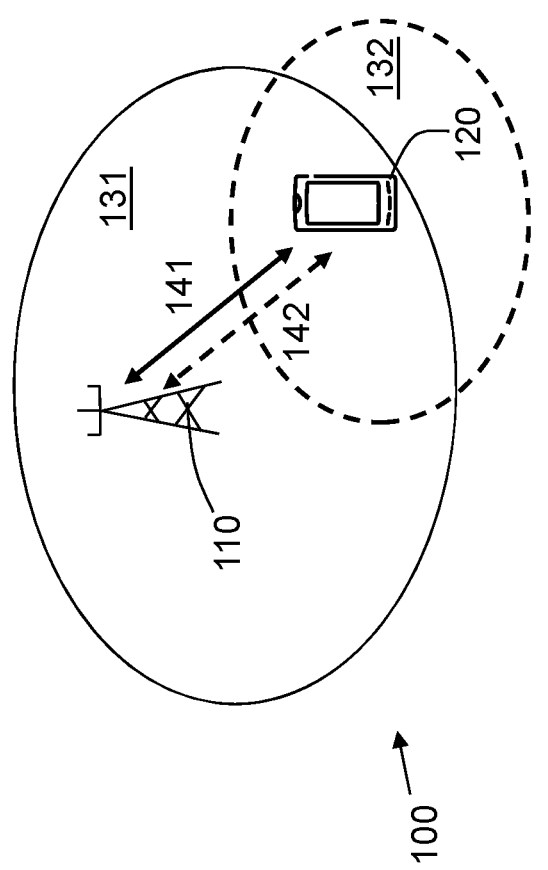
FIG. 11 is a schematic diagram depicting a wireless communications network.

FIG. 11 depicts an example of a wireless communications network 100, sometimes also referred to as a cellular radio system, cellular network or wireless communications system, in which embodiments herein may be implemented. The wireless communications network 100 may for example be a network such as a Long-Term Evolution (LTE), e.g.

LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5G system or any cellular network or system. Thus, although terminology from 3GPP LTE may be used in this disclosure to exemplify embodiments herein, this should not be seen as limiting the scope of the embodiments herein to only the aforementioned system.

The wireless communications network 100 comprises a plurality of network nodes whereof the network node 110 is depicted in FIG. 11. The network node 110 may be a transmission point such as a radio base station, for example an eNB, an eNodeB, or an Home Node B, an Home eNode B or any other network node capable to serve a wireless device, such as a user equipment or a machine type communication device in a wireless communications network.

The wireless communications network 100 covers a geographical area which is divided into cell areas, wherein each cell area is served by a network node, although, one network node may serve one or several cells. In the non-limiting example depicted in FIG. 11, the network node 110 serves a first cell 131 or primary cell 131. The primary cell 131 is typically in licensed spectrum. The network node 110 also serves a second cell 132, licensed-assisted access cell 132, also referred to herein as licensed-assisted access secondary cell 132, as defined above. The licensed-assisted access cell 132 is in unlicensed spectrum. The primary cell 131 and the licensed-assisted access cell 132 are used for communication between the network node 110 and wireless device 120. The network node 100 may be of different classes, such as, e.g., macro eNodeB, home eNodeB or pico base station, based on transmission power and thereby also cell size. Typically, wireless communications network 100 may comprise more cells similar to the first cell 131 and the second cell 132, served by their respective network node. This is not depicted in FIG. 14 for the sake of simplicity. The network node 110 may support one or several communication technologies, and its name may depend on the technology and terminology used. In 3GPP LTE, the network node 110, which may be referred to as eNodeBs or even eNBs, may be directly connected to one or more core networks.

The wireless device 120 also referred to herein as a user equipment or UE is located in the wireless communication network 100. The wireless device 120 may e.g. be a user equipment, a mobile terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term user equipment used in this document also covers other wireless devices such as Machine to machine (M2M) devices, even though they do not have any user. The wireless devices 120 is configured to communicate within the wireless communications network 100 with the network node 110 over a first radio link 141 in the primary cell 131, and over a second radio link 142 in the licensed-assisted access cell 132.

Any of the network node 110 and the wireless device 120 may be referred to herein as a transmitting node. Any of the network node 110 and the wireless device 120 may be referred to herein as a receiving node. It should be noted that any reference herein to a UE is understood to apply to a wireless devices such as the wireless device 120. Any reference herein to a eNB is understood to apply to a network node such as the network node 110. Any reference herein to a transmitting node or transmitter is understood to apply equally to a network node 110 or a wireless device 120. Any reference herein to a receiving node or receiver is understood to apply equally to a network node 110 or a wireless device 120.

It should be noted that the embodiments herein may be described as performing a receiver dependent contention window adaptation defined for load-based LBT systems operating in unlicensed bands when a transmitter intends to transmit data to multiple receivers. The contention window chosen at each transmitter should be receiver specific in order to optimally reflect different geographical distance or long-term channel conditions from a transmitter.

Furthermore, it should also be noted that a description of the proposed random back-off contention window variation techniques for LBT protocols is also described by the embodiments below. This is generally applicable for both DL and UL transmissions, and for both FDD and TDD systems. In the following, the contention window, CW, from which a random back-off counter may be drawn for a new LBT attempt is represented by CW, so that the counter drawn falls within the time interval [0, CW].

Also, it should be noted that, according to some embodiments, a physical intended receiver may be treated as a multitude of virtual intended receivers when said physical intended receiver has data with different quality of service, importance or delay tolerance classes. According to further embodiments, multiple contention windows corresponding to multiple physical or virtual intended receivers are handled in one transmission opportunity or instance.

Figure 12:
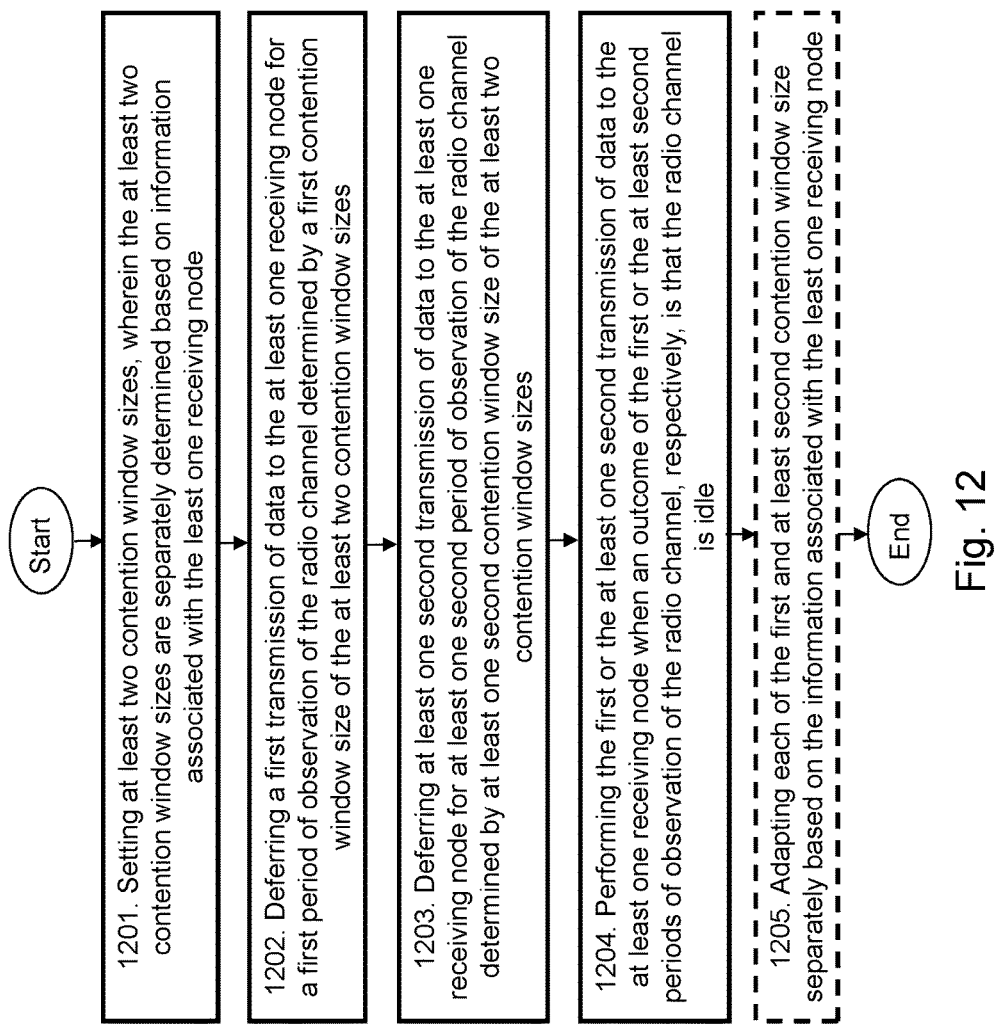
FIG. 12 is a flowchart depicting embodiments of a method in a transmitting node.

Example of embodiments of a method performed by a transmitting node 110, 120 for performing data transmissions to at least one receiving node 120, 110 on a radio channel in a wireless communications network 100, will now be described with reference to the flowchart depicted in FIG. 12. FIG. 12 illustrates an example of actions or operations which may be taken by transmitting node 110, 120. It should be noted that, in some embodiments, the least one receiving node 120, 110 may comprises two or more receiving nodes in the wireless communications network 100. In some embodiments, the transmitting node 110, 120 may also continuously monitor the radio channel. The method may comprise the following actions.

Action 1201

First, the transmitting node 110, 120 sets at least two contention window sizes, wherein the at least two contention window sizes are separately determined based on information associated with the least one receiving node 120, 110. It should be noted that this may also be described as the transmitting node 110, 120 setting at least two counters to values selected from at least two time intervals, wherein the at least two time intervals are separately determined based on information associated with the least one receiving node. Here, the at least two time intervals correspond to the at least two contention window sizes.

In some embodiments, the transmitting node 110, 120 may determine the first contention window size based on a priority of a first class of services of at least two classes of services with different priorities in the at least one receiving node 120, 110, and determine the at least second contention window size based on a priority of at least one second class of services of the at least two classes of services with different priorities in the at least one receiving node 120, 110. This may, for example, be performed when the least one receiving node 120, 110 is a single receiving node having at least two classes of services with different priorities.

In some embodiments, the information associated with the least one receiving node 120, 110 is one or more of:
the types of the least one receiving node 120, 110;
the service requirements of the least one receiving node 120, 110;
observed successes and/or failures of previously performed data transmissions to the least one receiving node 120, 110;
statistical information of the least one receiving node 120, 110, such as, e.g. long term Signal-to-Noise Ratio, SINR, distribution, Received Signal Strength Indicator, RSSI, histogram based on measurement reports of the least one receiving node 120, 110, frame error or retransmission probability experienced by the least one receiving node 120, 110; and
the number of the least one receiving node 120, 110 having transmissions of data scheduled at the same time.

In some embodiments, the transmitting node 110, 120 may determine a joint contention window size based on the first and at least second contention window size to be used when the transmitting node 110, 120 capable to serve more than one receiving node and schedule more than one receiving node during a single transmission instance. In some embodiments, the transmitting node 110, 120 may also obtain the information associated with the least one receiving node 120, 110 from another node in the wireless communications network 100.

Action 1202

After setting the at least two contention window sizes in Action 1201, the transmitting node 110, 120 defers a first transmission of data to the at least one receiving node 120, 110 for a first period of observation of the radio channel determined by a first contention window size of the at least two contention window sizes. In case of using the counter terminology in Action 1201, this may be described as the transmitting node 110, 120 deferring a first transmission of data to the at least one receiving node for a first period of observation of the radio channel determined by a first counter of the at least two counters.

Action 1203

In this action, the transmitting node 110, 120 also defers at least one second transmission of data to the at least one receiving node 120, 110 for at least one second period of observation of the radio channel determined by at least a second contention window size of the at least two contention window sizes. Also here, in case of using the counter terminology in Action 1201, this may be described as the transmitting node 110, 120 deferring at least one second transmission of data to the at least one receiving node for at least one second period of observation of the radio channel determined by at least one second counter of the at least two counters.

Action 1204

The transmitting node 110, 120 then performs the first or the at least one second transmission of data to the at least one receiving node 120, 110 when an outcome of the first or the at least second periods of observation of the radio channel, respectively, is that the radio channel is idle.

Action 1205

In this optional action, the transmitting node 110, 120 may adapt each of the first and at least second contention window size separately based on the information associated with the least one receiving node 120, 110. In some embodiments, the transmitting node 110, 120 may adapt by increasing at least one of the first and at least second contention window size when the corresponding transmission of data to the at least one receiving node 120, 110 is determined to be unsuccessful. In some embodiments, the transmitting node 110, 120 may adapt by increasing the at least one of the first and at least second contention window size in increments up to a determined maximum contention window size. In some embodiments, the transmitting node 110, 120 may adapt by decreasing at least one of the first and at least second contention window size when the corresponding transmission of data to the at least one receiving node 120, 110 is determined to be successful. In some embodiments, the transmitting node 110, 120 may adapt by resetting at least one of the first and at least second contention window size to a determined starting contention window size when the corresponding transmission of data to the at least one receiving node 120, 110 is determined to be successful. In some embodiments, the transmitting node 110, 120 may adapt by increasing and/or decreasing the rate of change separately for each of the first and at least second contention window size based on the information associated with the least one receiving node 120, 110. In some embodiments, the transmitting node 110, 120 may adapt according to a Listen Before Talk, LBT, algorithm.

Figure 13:
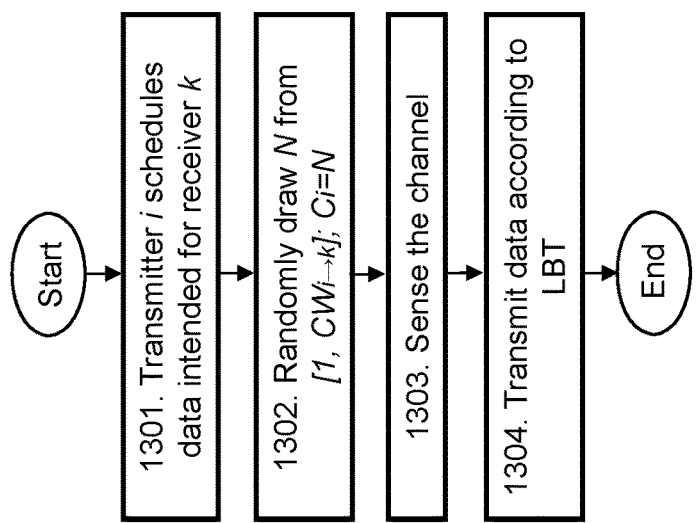
FIG. 13 illustrates receiver dependent contention window size according to some embodiments herein.
Figure 15:
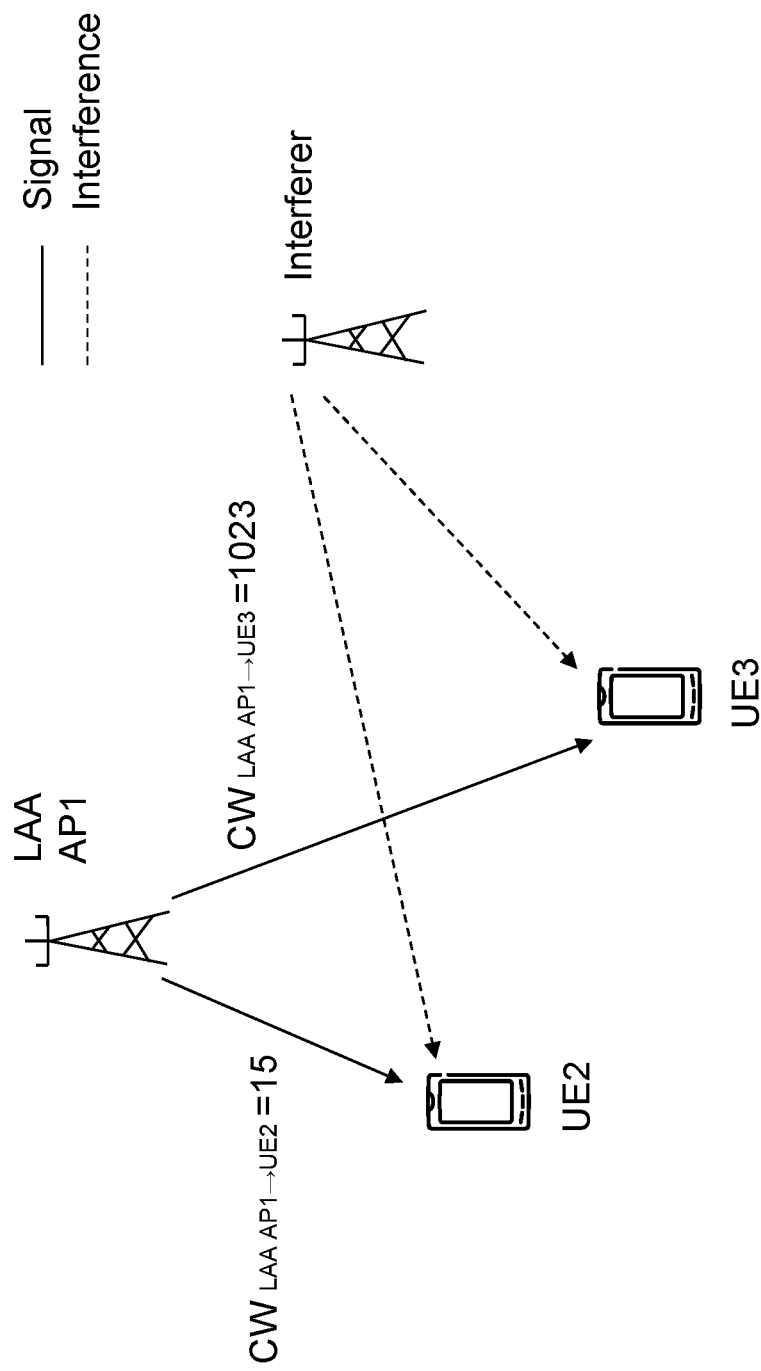
FIG. 15 further illustrates receiver dependent contention window adaptation according to some embodiments.

According to some embodiments, different contention window sizes may be used at the same transmitter, e.g. the transmitting node 110, 120. This may also be referred to herein as having receiver dependent contention windows, CWs. FIG. 13 is an example describing the high level procedure of receiver dependent CW adjustment. It should be noted that the Actions 1301-1304 described with reference to FIG. 13 illustrate embodiments of the Actions 1201-1204 described above with reference to FIG. 12. A transmitter i, e.g. an AP, may maintain a contention window size for each of the associated receivers, i.e. at least one receiving node 120, 110.

Action 1301. The transmitter i schedules data intended for a receiver k.

Action 1302. The transmitter i randomly chooses N from a given contention widow size $CW_{i \to k}$. Here $CW_{i \to k}$ is a receiver dependent parameter intended for receiver k associated with a serving AP i.

Action 1303. The transmitter i senses the channel.

Action 1304. The transmitter i transmits the data according to LBT.

According to one aspect, the contention window size assigned to the receiver may depend on the type of the receiver. According to another aspect, the contention window size assigned to the receiver may depend on the service requirements for the receivers. According to yet another aspect, the contention window size of a receiver may be retrieved from a centralized management entity.

According to a further aspect, the contention window size for a receiver may be reconfigured. According to yet a further aspect, the transmitter may double the contention window sizes of all its associated receivers. According to yet a further aspect, the transmitter may increase the contention window sizes of all its associated receivers by the same amount.

Figure 14:
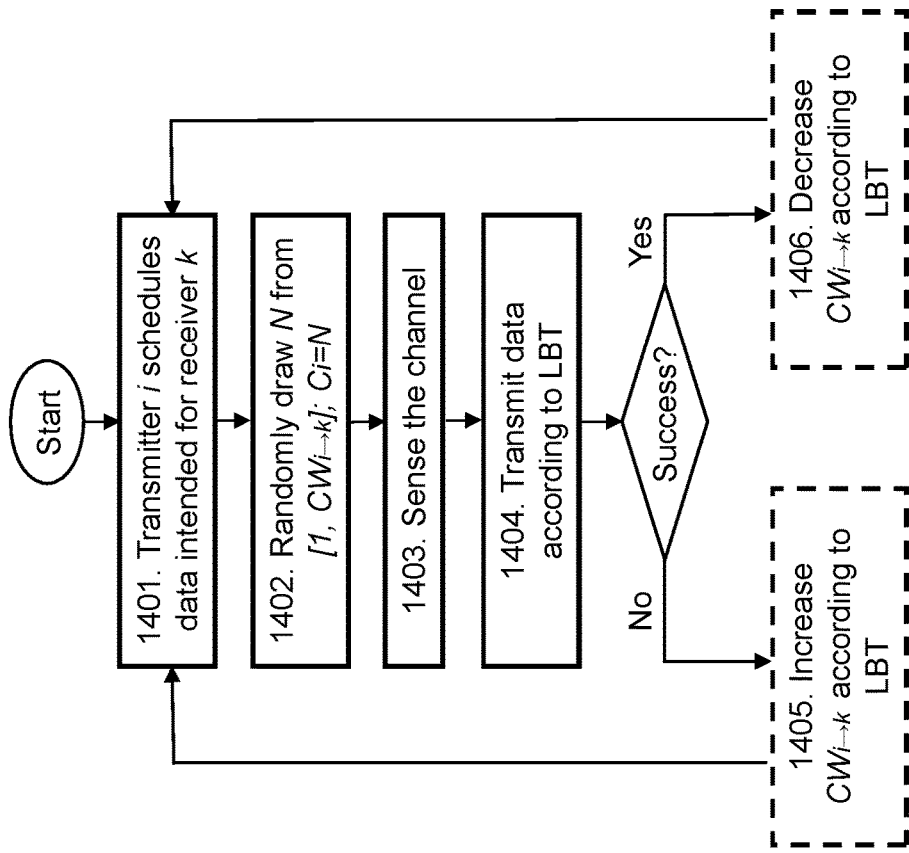
FIG. 14 illustrates receiver dependent contention window adaptation according to some embodiments herein.

According to some embodiments, the contention window size for each associated receiver may be adapted separately by the transmitter. This may also be referred to herein as having receiver dependent contention window, CW, adjustment. An example of this second embodiment is illustrated in FIG. 14, wherein the contention window sizes are adapted based on observed successes or failures of previous transmissions. It should be noted that the Actions 1401-1406 described with reference to FIG. 14 illustrate embodiments of the Actions 1201-1205 described above with reference to FIG. 12. In these embodiments, Actions 1401-1404 correspond to Actions 1301-1304 described with reference to FIG. 13, but further comprise Actions 1405-1406.

Action 1405. If the transmission to UE k is successful, CW-k may be reset by the transmitter i of a specific value CWmin according to the LBT algorithm in use.

Action 1406. Otherwise, the CW-k may be increased by the transmitter i, up to a limit of CWmax, according to the specific rules in determined LBT protocols of the system. According to some embodiments, the contention window size CW-k is doubled if one or more previous transmissions result in errors.

According to some aspects, the rate of increase of contention windows between CWmin and CWmax used for each receiver may be different. For example, the contention window for UE p may be doubled if one or more previous transmissions results in errors whereas the contention window for UE q may be tripled if one or more previous transmissions results in errors. This may generalized by using different sets of values for the contention windows for different UEs. Therefore, in general, for the k:th UE, the transmitter may use a set of contention windows, $CW_{i \rightarrow k} \in \{CWmin, CW_{i \rightarrow k}(1), CW_{i \rightarrow k}(2), \ldots, CWmax\}$.

An illustrative example of receiver dependent CW adaptation, as described above, is illustrated in FIG. 15. Here, LAA AP1, e.g. a transmitting node 110, differentiates CW according to the channel conditions of the UE's, e.g. the at least one receiving node 120. LAA AP1 uses a shorter contention windows size $CW1_{LAA\ AP1\_UE2}$ (also denoted CW1→) for a cell center UE2 than the contention windows size $CW1_{LAA\ AP1\_UE3}$ (also denoted CW1→3) for a cell edge UE3.

Here it should be noted that a cell center UE2 is closer to the LAA AP1 that a cell edge UE3.

According to some embodiments, the CWmin and CWmax parameters may be receiver-dependent parameters rather than transmitter or traffic type dependent, such as, for example, for the standard IEEE 802.11. More specifically, each transmitter may use long-term statistical information, to adaptively determine or derive optimized CWmin and CWmax parameter settings. This may also be referred to herein as having receiver dependent CWmin and CWmax adjustment.

Thus, in some embodiments, based on this UE specific long term information, a pair of CWmin and CWmax for UE j may be selected. For example, if assumed that LAA AP i is to set CWmin(i,j) and CWmax(i,j) for its associated UE j. Then, a table may be predetermined and may be used by the AP i in order to find a proper CWmin(i,j) and CWmax(i,j).

Table 1 below illustrates an example of such a table that, for example, each LAA AP may comprise or have access to for determining CWmin(i,j) and CWmax(i,j) when metric X is used for the long-term statistical information. In other words, Table 1 is an illustrative example of receiver dependent CWmin and CWmax adaptation based on long-term statistical information.

| (CWmin(i, j) CWmax(i, j)) | Metric X of UE j from LAA AP i satisfies |
|---|---|
| (CWmin1 CWmax1) | Condition x1 (e.g., $0 \le X \le x1$) |
| (CWmin2 CWmax2) | Condition x2 (e.g., $x1 < X \le x2$) |
| (CWmin3 CWmax3) | Condition x3 |
| ... | ... |
| (CWmin, k CWmax, k) | Condition $x_k$ |

It is also possible that one of CWmin,k and CWmax,k may be fixed regardless of k so that each AP adaptively may change either the contention window's lower or its upper limit.

Various types of receiver specific statistical information may be used as the metrics. According to some embodiments, the metrics used may comprise one or more of:

Long-term Signal-to-Noise Ratio, SINR, distribution of receiver;

Received Signal Strength Indicator, RSSI, histogram based on receiver j measurement report; or Frame error or retransmission probability experienced by receiver j.

According to some embodiments, there may be instances when an intended receiver has multiple classes of services with different priorities. This may also be referred to herein as having receiver dependent contention window, CW, adjustment for multiple service classes. In this case, an intended receiver j may have two services, one of type m and one of type n. Then, according to some embodiments, a receiver dependent CWi→j at LAA AP i may be further specified to also reflect or indicate the priority of the two types of services m and n, e.g. the service type m have CWi→j (m) and the service type n may have CWi→j (n). Thus, in case service type m has a higher priority than the service type n, each LAA AP i may configure the contention windows such that CWi→j (m)<CWi→j (n). Similarly, CWmin(i,j) and CWmax(i,j) may also be service specific.

According to some embodiments, there may also be instances when receiver dependent CW adjustment is to be performed as downlink multiplexing both in time and frequency domain is supported by the transmitter. This may also be referred to herein as having receiver dependent contention window, CW, adjustment for multiple users.

An example of such a multiplexing transmitter is an LTE eNB, where more than one receiver may be served by, or associated with, the same LAA AP and be scheduled during a single transmission opportunity. In this case, a joint contention window, $CW_{JT}$, may be used which may be a function of all scheduled UE's CWs.

For example, in case an LAA AP i schedules UE j and k at a given transmission opportunity. Then, $CW_{JT}$ may be determined or calculated as a function $f$ of $CW_{i \rightarrow j}$ and $CW_{i \rightarrow k}$, i.e. $CW_{JT} = f(CW_{i \rightarrow j}, CW_{i \rightarrow k})$.

According to one aspect, the joint contention window size may be a linear average of the contention window sizes of the scheduled receivers, e.g. rounded up to generate an integer, such as, e.g. $CW_{JT} = \text{ceil}((CW_{i \rightarrow j} + CW_{i \rightarrow k})/2)$.

According to another aspect, the joint contention window size may be a linearly weighted average of the contention window sizes of the scheduled receivers, such as, e.g. $CW_{JT} = \text{ceil}(w_h \times CW_{i \rightarrow j} \times CW_{i \rightarrow k})$.

According to yet another aspect, where $w_j$ and $w_k$ are weights for corresponding CW, the weights may take into account or be at least partly based on the amount of resource block allocations. For example, the weights may be calculate as:

$$w_j=nj/(nj+nk) \text{ and } wk=nj/(nj+nk).$$

where nj and nk may represent the number of allocated resource blocks to each UE at a given transmission opportunity.

According to a further aspect, the joint contention window size may be a harmonic average of the contention window sizes of the scheduled receivers, such as, for example, $CW_{JT}=\text{ceil}(1/(1/CW_{i\rightarrow j}+1/CW_{i\rightarrow k}))$.

According to yet a further aspect, the joint contention window size may be a geometric average of the contention window sizes of the scheduled receivers, such as, for example, $CW_{JT}=\text{ceil}(\sqrt{CW_{i\rightarrow j}\cdot CW_{i\rightarrow k}})$.

According to yet a further aspect, the joint contention window size may be a min or max function, such as, for example, $CW_{JT}=\min(CWi\rightarrow j, CWi\rightarrow k)$, or $CW_{JT}=\max(CWi\rightarrow j, CWi\rightarrow k)$.

Figure 16:
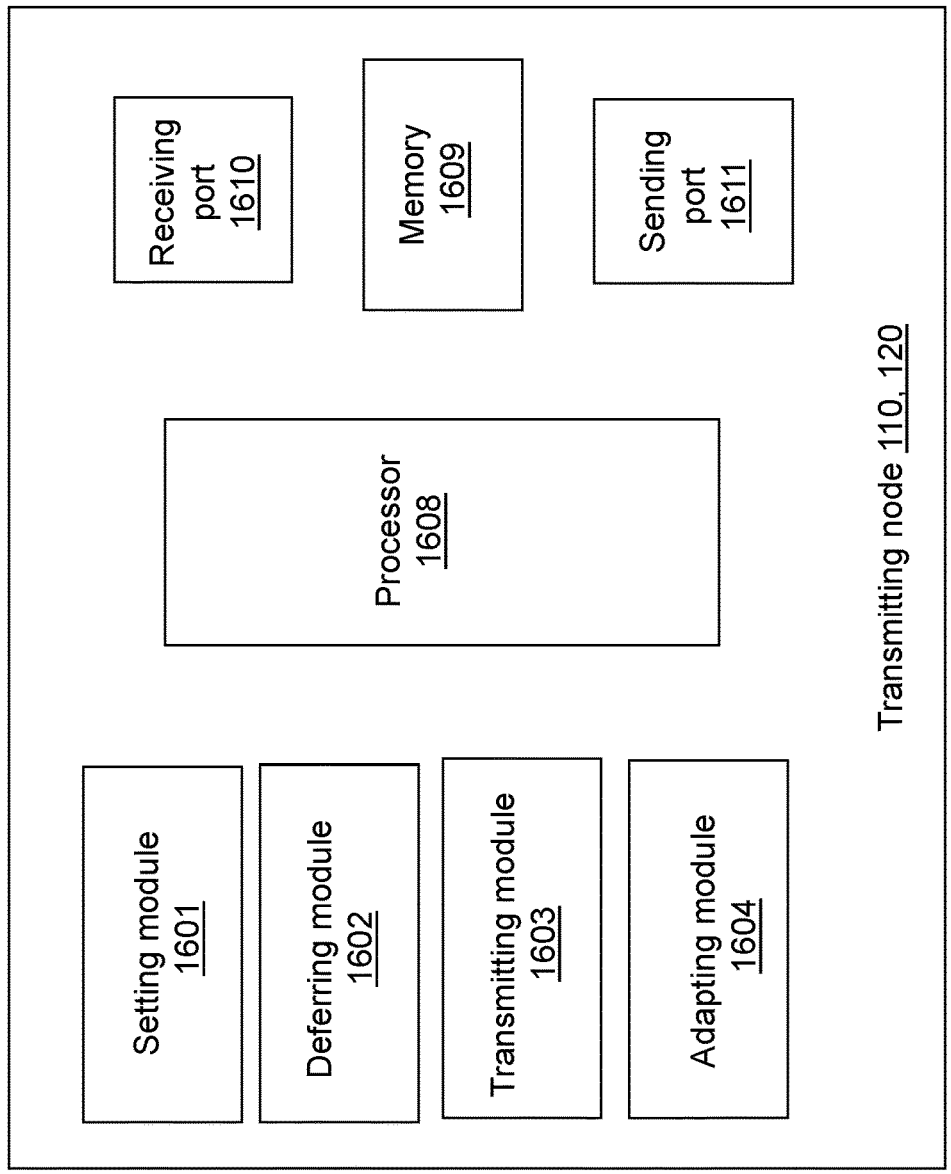
FIG. 16 is a schematic block diagram illustrating embodiments of a transmitting node.

The embodiments herein may be implemented through one or more processors, such as a processor 1608 in the transmitting node 110, 120 depicted in FIG. 16, together with computer program code for performing the functions and actions of the embodiments herein. The program code mentioned above may also be provided as a computer program product, for instance in the form of a data carrier carrying computer program code for performing the embodiments herein when being loaded into the transmitting node 110, 120. One such carrier may be in the form of a CD ROM disc. It is however feasible with other data carriers such as a memory stick. The computer program code may furthermore be provided as pure program code on a server and downloaded to the transmitting node 110, 120.

The transmitting node 110, 120 may further comprise a memory 1609 comprising one or more memory units. The memory 1609 is arranged to be used to store obtained information, store data, configurations, scheduling, and applications etc. to perform the methods herein when being executed in transmitting node 110, 120.

In some embodiments, the transmitting node 110, 120 may receive information through a receiving port 1610. In some embodiments, the receiving port 1610 may be, for example, connected to the two or more antennas in the transmitting node 110, 120. In other embodiments, the transmitting node 110, 120 may receive information from another structure in the wireless communications network 100 through the receiving port 1610. Since the receiving port 1610 may be in communication with the processor 1608, the receiving port 1608 may then send the received information to the processor 1610. The receiving port 1608 may also be configured to receive other information.

The processor 1608 in the transmitting node 110, 120 may be further configured to transmit or send information through a sending port 1611, which may be in communication with the processor 1608 and the memory 1609.

Furthermore, this means that the transmitting node is configured to set at least two contention window sizes, wherein the at least two contention window sizes are separately determined based on information associated with the least one receiving node 120, 110. In other words, the transmitting node may be configured to set at least two counters to values selected from at least two time intervals, wherein the at least two time intervals are separately determined based on information associated with the least one receiving node 120, 110. The transmitting node 110, 120 is configured to perform this action, e.g. by means of a setting module 1601 within the transmitting node. The setting module 1601 may be a processor of the transmitting node, or an application running on such processor.

The transmitting node 110, 120 is also configured to defer a first transmission of data to the at least one receiving node 120, 110 for a first period of observation of the radio channel determined by a first counter of the at least two counters. In other words, the transmitting node 110, 120 may also be configured to defer a first transmission of data to the at least one receiving node 120, 110 for a first period of observation of the radio channel determined by a first contention window size of the at least two contention window sizes. Furthermore, the transmitting node 110, 120 may also be configured to defer at least one second transmission of data to the at least one receiving node 120, 110 for at least one second period of observation of the radio channel determined by at least one second counter of the at least two counters. In other words, the transmitting node 110, 120 may also be configured to defer at least one second transmission of data to the at least one receiving node 120, 110 for at least one second period of observation of the radio channel determined by at least a second contention window size of the at least two contention window sizes. The transmitting node 110, 120 is configured to perform these actions, e.g. by means of a deferring module 1602 within the transmitting node 110, 120. The deferring module 1602 may be a processor of the transmitting node 110, 120, or an application running on such processor.

The transmitting node 110, 120 is configured to perform the first or the at least one second transmission of data to the at least one receiving node 120, 110 when an outcome of the first or the at least second periods of observation of the radio channel, respectively, is that the radio channel is idle. The transmitting node 110, 120 is configured to perform this action, e.g. by means of a performing or transmitting module 1603 within the transmitting node 110, 120. The performing module or transmitting module 1603 may be a processor of the transmitting node 110, 120, or an application running on such processor.

In some embodiments, the transmitting node 110, 120 may be further configured to determine the first contention window size based on a priority of a first class of services of at least two classes of services with different priorities in the at least one receiving node 120, 110, and determine the at least one second contention window size based on a priority of at least one second class of services of the at least two classes of services with different priorities in the at least one receiving node 120, 110. In this case, the least one receiving node 120, 110 may be a single receiving node having at least two classes of services with different priorities.

In some embodiments, the information associated with the least one receiving node 120, 110 is one or more of: the types of the least one receiving node 120, 110; the service requirements of the least one receiving node 120, 110; observed successes and/or failures of previously performed data transmissions to the least one receiving node 120, 110; statistical information of the least one receiving node 120, 110 (such as, e.g. long term Signal-to-Noise Ratio, SINR, distribution, Received Signal Strength Indicator, RSSI, histogram based on measurement reports of the least one receiving node 120, 110, frame error or retransmission probability experienced by the least one receiving node 120, 110); and the number of the least one receiving node 120, 110 having transmissions of data scheduled at the same time.

In some embodiments, the transmitting node 110, 120 may be further configured to adapt each of the first and at least second contention window size separately based on the information associated with the least one receiving node 120, 110. In other words, the transmitting node 110, 120 may be further configured to adapt each of the at least two time intervals separately based on the information associated with the least one receiving node 120, 110. The transmitting node 110, 120 is configured to perform this action, e.g. by means of a adapting module 1604 within the transmitting node 110, 120. The adapting module 1604 may be a processor of the transmitting node 110, 120, or an application running on such processor.

In some embodiments, the transmitting node 110, 120 may be further configured to perform the adaptation by increasing at least one of the first and at least second contention window size when the corresponding transmission of data to the at least one receiving node 120, 110 is determined to be unsuccessful. In other words, the transmitting node 110, 120 may be further configured to perform the adaptation by increasing at least one time interval of the at least two time intervals when the corresponding transmission of data to the at least one receiving node 120, 110 is determined to be unsuccessful or has failed.

In some embodiments, the transmitting node 110, 120 may be further configured to perform the adaptation by increasing at least one of the first and at least second contention window size in increments up to a determined maximum contention window size time interval. In other words, the transmitting node 110, 120 may be further configured to perform the adaptation by increasing the at least one time interval of the at least two time intervals in increments up to a determined maximum time interval.

In some embodiments, the transmitting node 110, 120 may be further configured to perform the adaptation by decreasing at least one of the first and at least second contention window size when the corresponding transmission of data to the at least one receiving node 120, 110 is determined to be successful. In other words, the transmitting node 110, 120 may be further configured to perform the adaptation by decreasing at least one time interval of the at least two time intervals when the corresponding transmission of data to the at least one receiving node 120, 110 is determined to be successful.

In some embodiments, the transmitting node 110, 120 may be further configured to perform the adaptation by resetting at least one of the first and at least second contention window size to a determined starting contention window size when the corresponding transmission of data to the at least one receiving node 120, 110 is determined to be successful. In other words, the transmitting node 110, 120 may be further configured to perform the adaptation by resetting at least one time interval of the at least two time intervals to a determined starting time interval when the corresponding transmission of data to the at least one receiving node 120, 110 is determined to be successful.

In some embodiments, the transmitting node 110, 120 may be further configured to perform the adaptation by increasing and/or decreasing the rate of change separately for each of the first and at least second contention window size based on the information associated with the least one receiving node 120, 110. In other words, the transmitting node 110, 120 may be further configured to perform the adaptation by increasing and/or decreasing the rate of change separately for each of the at least two time intervals based on the information associated with the least one receiving node 120, 110.

In some embodiments, the transmitting node 110, 120 may be further configured to adapt each of the first and at least second contention window size according to a Listen Before Talk, LBT, algorithm. In other words, the transmitting node 110, 120 may be further configured to adapt each of the at least two time intervals according to a Listen Before Talk, LBT, algorithm.

In some embodiments, the transmitting node 110, 120 may be further configured to determine a joint contention window size based on the first and at least second contention window size to be used when the transmitting node 110, 120 110, 120 is capable to serve more than one receiving node 120, 110 and schedule more than one receiving node 120, 110 during a single transmission instance. In other words, the transmitting node 110, 120 may be further configured to determine a joint time interval based on the at least two time intervals to be used by all of the at least two counters when the transmitting node 110, 120 capable to serve more than one receiving node 120, 110 and schedule more than one receiving node 120, 110 during a single transmission instance.

In some embodiments, the transmitting node 110, 120 may be further configured to obtain the information associated with the least one receiving node 120, 110 from another node in the wireless communications network, such as, e.g. a centralized management node.

It should be noted that the values of the counters are values for idle periods of observation of a radio channel. The radio channel is wherein data may be transmitted by the radio node 101. The idle periods of observation may be, for example, one or more CCAs.

The transmitting node 110, 120 may comprise an interface unit (not shown) to facilitate communications between the transmitting node 110, 120 and other nodes or devices, e.g., any of the network node 110 and the wireless device 120. The interface may, for example, include a transceiver configured to transmit and receive radio signals over an air interface in accordance with a suitable standard. Embodiments herein may comprise an enhanced load-based clear channel assessment.

Those skilled in the art will also appreciate that the setting module 1601, the deferring module 1602, the performing module 1603, and the adapting module 1604 described above may refer to a combination of analog and digital modules, and/or one or more processors configured with software and/or firmware, e.g., stored in memory, that, when executed by the one or more processors such as the processor 1608, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1601-1604 described above may be implemented as one or more applications running on one or more processors such as the processor 1608.

Thus, the methods according to the embodiments described herein for the transmitting node 110, 120 may be implemented by means of a computer program product, comprising instructions, i.e., software code portions, which, when executed on at least one processor, cause the at least one processor to carry out the actions described herein, as performed by the transmitting node 110, 120. The computer program product may be stored on a computer-readable storage medium. The computer-readable storage medium, having stored there on the computer program, may comprise instructions which, when executed on at least one processor, cause the at least one processor to carry out the actions described herein, as performed by the transmitting node 110, 120. In some embodiments, the computer-readable storage medium may be a non-transitory computer-readable storage medium, such as a CD ROM disc, or a memory stick. In other embodiments, the computer program product may be stored on a carrier containing the computer program just described, wherein the carrier is one of an electronic signal, optical signal, radio signal, or the computer-readable storage medium, as described above.

When using the word "comprise" or "comprising" it shall be interpreted as non-limiting, i.e. meaning "consist at least of". The embodiments herein are not limited to the above described preferred embodiments. Various alternatives, modifications and equivalents may be used. Therefore, the above embodiments should not be taken as limiting the scope of the invention. It is to be understood that the embodiments are not to be limited to the specific examples disclosed, and that modifications and other variants are intended to be included within the scope of this disclosure. Although specific terms may be employed herein, they are used in a generic and descriptive sense only and not for purposes of limitation.

ABBREVIATIONS

AP Access point
CA Carrier Aggregation
CCA Clear Channel Assessment
CW Contention Window
DCF Distributed Coordination Function
DIFS DCF Inter-frame Spacing
DL Downlink
DRS Discovery Reference Signal
eNB evolved NodeB, base station
TTI Transmission-Time Interval
LAA Licensed Assisted Access
LBT Listen Before Talk
PDCCH Physical Downlink Control Channel
PIFS PCF Inter-frame Spacing
PUSCH Physical Uplink Shared Channel
QoS Quality of Service
QCI QoS Class Indentifier
SCell Secondary Cell
SIFS Short Inter-frame Spacing
UE User Equipment
UL Uplink

The invention claimed is:

1. A method performed by a transmitting node for performing data transmissions to at least one receiving node on a radio channel in a wireless communications network, the method comprising
   setting at least two contention window sizes for at least two different contention windows, the at least two contention window sizes of the at least two different contention windows being separately determined based on information associated with the least one receiving node;
   deferring a first transmission of data to the at least one receiving node for a first period of observation of the radio channel determined by a first contention window size of a first contention window of the at least two different contention windows at the transmitting node;
   deferring at least one second transmission of data to the at least one receiving node for at least one second period of observation of the radio channel determined by at least a second contention window size of at least a second contention window of the at least two different contention windows at the transmitting node; and
   performing one of the first and the at least one second transmission of data to the at least one receiving node when an outcome of the at least one of the first and the at least second periods of observation of the radio channel, respectively, is that the radio channel is idle.

2. The method according to claim 1, wherein the first contention window size is determined based on a priority of a first class of services of at least two classes of services with different priorities in the at least one receiving node, and the at least second contention window size is determined based on a priority of at least one second class of services of the at least two classes of services with different priorities in the at least one receiving node.

3. The method according to claim 1, wherein the information associated with the least one receiving node is one or more of:
   the types of the least one receiving node;
   the service requirements of the least one receiving node;
   at least one of observed successes and failures of previously performed data transmissions to the least one receiving node;
   statistical information of the least one receiving node; and
   the number of the least one receiving node having transmissions of data scheduled at the same time.

4. The method according to claim 1, further comprising:
   adapting each of the first and at least second contention window size separately based on the information associated with the least one receiving node.

5. The method according to claim 4, wherein the adapting further comprises increasing at least one of the first and at least second contention window size when the corresponding transmission of data to the at least one receiving node is determined to be unsuccessful.

6. The method according to claim 5, wherein the adapting further comprises increasing the at least one of the first and at least second contention window size in increments up to a determined maximum contention window size.

7. The method according to claim 4, wherein the adapting further comprises increasing and/or decreasing the rate of change separately for each of the first and at least second contention window size based on the information associated with the least one receiving node.

8. The method according to claim 4, wherein the adapting is performed according to a Listen Before Talk, LBT, algorithm.

9. The method according to claim 1, wherein the adapting further comprises decreasing at least one of the first and at least second contention window size when the corresponding transmission of data to the at least one receiving node is determined to be successful.

10. The method according to claim 9, wherein the adapting further comprises resetting at least one of the first and at least second contention window size to a determined starting contention window size when the corresponding transmission of data to the at least one receiving node is determined to be successful.

11. The method according to claim 1, further comprising determining a joint contention window size based on the first and at least second contention window size to be used when the transmitting node capable of serving more than one receiving node and scheduling more than one receiving node during a single transmission instance.

12. The method according to claim 1, further comprising obtaining the information associated with the least one receiving node from another node in the wireless communications network.

13. A transmitting node for performing data transmissions to at least one receiving node on a radio channel in a wireless communications network, the transmitting node having a processor and a memory, the memory storing computer executable instructions that, when executed by the processor, configure the processor to:
set at least two contention window sizes for at least two different contention windows, the at least two contention window sizes of the at least two different contention windows being separately determined based on information associated with the least one receiving node;
defer a first transmission of data to the at least one receiving node for a first period of observation of the radio channel determined by a first contention window size of a first contention window of the at least two different contention windows at the transmitting node;
defer at least one second transmission of data to the at least one receiving node for at least one second period of observation of the radio channel determined by at least a second contention window size of at least a second contention window of the at least two different contention windows at the transmitting node; and
perform one of the first and the at least one second transmission of data to the at least one receiving node when an outcome of the one of the first and the at least one second period of observation of the radio channel, respectively, is that the radio channel is idle.

14. The transmitting node according to claim 13, wherein the memory further stores computer executable instructions that, when executed by the processor, further configure the processor to determine the first contention window size based on a priority of a first class of services of at least two classes of services with different priorities in the at least one receiving node, and determine the at least one second contention window size based on a priority of at least one second class of services of the at least two classes of services with different priorities in the at least one receiving node.

15. The transmitting node according to claim 13, wherein the information associated with the least one receiving node is one or more of:
the types of the least one receiving node;
the service requirements of the least one receiving node;
observed successes and/or failures of previously performed data transmissions to the least one receiving node;
statistical information of the least one receiving node; and
the number of the least one receiving node having transmissions of data scheduled at the same time.

16. The transmitting node according to claim 13, further configured to adapt each of the first and at least second contention window size separately based on the information associated with the least one receiving node.

17. The transmitting node according to claim 16, wherein the memory further stores computer executable instructions that, when executed by the processor, further configure the processor to increase at least one of the first and at least second contention window size when the corresponding transmission of data to the at least one receiving node is determined to be unsuccessful.

18. The transmitting node according to claim 17, wherein the memory further stores computer executable instructions that, when executed by the processor, further configure the processor to increase at least one of the first and at least second contention window size in increments up to a determined maximum contention window size time interval.

19. The transmitting node according to claim 16, wherein the memory further stores computer executable instructions that, when executed by the processor, further configure the processor to at least one of increase and decrease the rate of change separately for each of the first and at least second contention window size based on the information associated with the least one receiving node.

20. The transmitting node according to claim 16, wherein adapting each of the first and at least second contention window size is performed according to a Listen Before Talk, LBT, algorithm.

21. The transmitting node according to claim 13, wherein the memory further stores computer executable instructions that, when executed by the processor, further configure the processor to decrease at least one of the first and at least second contention window size when the corresponding transmission of data to the at least one receiving node is determined to be successful.

22. The transmitting node according to claim 21, wherein the memory further stores computer executable instructions that, when executed by the processor, further configure the processor to reset at least one of the first and at least second contention window size to a determined starting contention window size when the corresponding transmission of data to the at least one receiving node is determined to be successful.

23. The transmitting node according to claim 13, wherein the memory further stores computer executable instructions that, when executed by the processor, further configure the processor to determine a joint contention window size based on the first and at least second contention window size to be used when the transmitting node is capable of serving more than one receiving node and scheduling more than one receiving node during a single transmission instance.

24. The transmitting node according to claim 13, wherein the memory further stores computer executable instructions that, when executed by the processor, further configure the processor to obtain the information associated with the least one receiving node from another node in the wireless communications network.

* * * * *